United States Patent [19]
Johnson et al.

[11] Patent Number: 6,132,663
[45] Date of Patent: Oct. 17, 2000

[54] METHOD FOR MOLDING FOOTWEAR SOLE COMPONENT

[75] Inventors: Jeffrey L. Johnson, Lake Oswego, Oreg.; Chang Dong Fong, Taichung, Taiwan

[73] Assignee: Nike, Inc., Beaverton, Oreg.

[21] Appl. No.: 08/934,383

[22] Filed: Sep. 19, 1997

[51] Int. Cl.[7] .............................. B29C 45/16; A43B 13/12
[52] U.S. Cl. .......................... 264/250; 264/261; 264/266; 264/267; 264/271.1; 264/277; 264/278; 425/129.2; 249/91; 249/93; 36/136; 36/137
[58] Field of Search ................................... 264/250, 261, 264/266, 267, 271.1, 328.8, 318, 277, 278; 425/129.2, 119, 117; 36/136, 137; 249/155, 157, 161, 91, 93

[56] References Cited

U.S. PATENT DOCUMENTS

| | | | |
|---|---|---|---|
| 2,764,768 | 10/1956 | Ashley et al. | 12/133 |
| 4,123,493 | 10/1978 | Schilke et al. | 264/244 |
| 4,688,752 | 8/1987 | Barteck et al. | 249/85 |
| 4,817,304 | 4/1989 | Parker et al. | 36/114 |
| 4,845,863 | 7/1989 | Yung-mao | 36/114 |
| 4,867,663 | 9/1989 | Woerner et al. | 425/111 |
| 5,685,090 | 11/1997 | Tawney et al. | 36/29 |
| 5,718,063 | 2/1998 | Yamashita et al. | 36/28 |
| 5,775,005 | 7/1998 | McClelland | 36/31 |

*Primary Examiner*—Mathieu D. Vargot
*Assistant Examiner*—Suzanne E. McDowell
*Attorney, Agent, or Firm*—Banner & Witcoff, Ltd.

[57] ABSTRACT

A method for mass producing midsoles for articles of footwear includes the following steps: forming first midsole portions of an article of footwear in predetermined sizes with a hollow area for receiving an insert and an aperture in at least one side of the first midsole portion for viewing the insert; forming inserts in predetermined sizes and shapes for placement in the hollow area of the first midsole portions; matching the predetermined size of the inserts to one or more predetermined sizes of first midsole portions; forming the size and shape of the hollow area and aperture for a given size first midsole portion to accommodate the predetermined size and shape of the insert; placing inserts into the hollow area of size matched first midsole portions; adjusting the position of the at least one aperture gasket along the side of the mold to align with the aperture in the first midsole portion; inserting the aperture gasket into the aperture of the first midsole portion to completely seal the aperture; pouring an encasing material into the hollow area of the first midsole portion and around the insert; closing the mold around the hollow area of the first midsole portion; and allowing the encasing material to cure around the insert to secure the insert to the first midsole portion whereby the insert and encasing material form a second midsole portion.

18 Claims, 3 Drawing Sheets

METHOD FOR MOLDING FOOTWEAR SOLE COMPONENT

TECHNICAL FIELD

The present invention is directed to an apparatus and method for molding an article of footwear sole component, and, more particularly, to an apparatus and method for molding a midsole for an article of footwear having an insert, preferably in the form of a fluid filled bladder, and apertures, commonly referred to as windows, provided in sides of the midsole which provide visibility of the insert.

BACKGROUND OF THE INVENTION

Footwear such as athletic footwear often has a midsole which is formed of two or more components. The midsoles are typically formed in molds, which require complex shapes in order to form a desired profile. The formation of a midsole having multiple components historically has required two separate molds, each having a complex shape matching the entire midsole, leading to increased manufacturing complexity and costs. Each half shoe size has typically required a different set of molds as well, leading to increased costs.

The footwear may contain an insert, such as a fluid filled bladder, which is disposed in a hollow area or cavity formed in the heel region of the midsole, to provide additional cushioning. In certain footwear midsoles, the insert is visible from the exterior of the article of footwear through apertures provided in the exterior of the midsole. To form footwear with an insert, a first portion of the midsole, typically made from a compressed EVA foam material such as Phylon, is formed in a fully shaped mold. Apertures are then cut through the side walls of the first portion. The formed first portion is placed in a second fully shaped mold, an insert is placed in the cavity formed in an area, such as the heel, of the first portion, a secondary material such as polyurethane is poured onto the first portion over the insert, and the secondary material is then cured. Having a second fully shaped mold is expensive and requires a complete refabrication of the second mold when a different sized midsole is desired, or when the location or size of the viewing aperture is changed.

The molds used to form such midsoles are desirably made with tight seals to reduce blow by of excess poured material when the mold is closed. Blow by, when used herein, is a term used to describe the seepage of poured material through gaps in the mold into regions where the material is not desired. Material that blows by becomes attached to the periphery of the midsole and must be removed by trimming, which is labor intensive, thereby increasing manufacturing costs as well. Over time the molds tend to settle or become worn, which increases the possibility of blow by and the subsequent need for trimming and cleaning the midsoles.

It is an object of the present invention to provide a method and apparatus for molding components for articles of footwear which reduce or wholly overcome some or all of the aforesaid difficulties inherent in prior known devices. Particular objects and advantages of the invention will be apparent to those skilled in the art, in view of the following disclosure of the invention and detailed description of certain preferred embodiments.

SUMMARY OF THE INVENTION

The principles of the invention may be used to advantage to provide a midsole molding apparatus comprising a molding frame and interchangeable parts which allow multiple sizes of midsoles, as well as midsoles with multiple sizes and shapes of inserts and viewing windows, to be formed in the same molding apparatus.

In accordance with a first aspect, the apparatus includes a molding frame comprising a bottom, opposed end walls, a fixed side wall, a hinged side wall, a hinged top. A pair of support members each extend within the molding frame and are attached to a side wall; a pair of gaskets each extend within the molding frame and are attached to a side wall; an end support is attached to an end wall; and a heel plug is attached to a lower surface of the top.

In accordance with another aspect, the support members, the gaskets, the heel plug and the end support are attached such that they may be adjusted to different positions. The heel plug and the gaskets may be replaced with different sized components to compensate for different sized first midsole portions, inserts and apertures in the first midsole portion and to reduce blow by of material. The support members may be attached via fasteners which extend through upper slots formed along the side walls. The gaskets or spacers may be attached to plates via threaded members which extend through lower slots formed in the side walls, the plates being attached via fasteners which extend through the slots.

In accordance with certain preferred embodiments a method is provided for mass producing midsoles for articles of footwear in a variety of sizes. The midsoles have a first midsole portion, inserts received in hollow areas in the first midsole portions, and an aperture is formed in at least one side of the first midsole portion to make the insert visible from a side of the first midsole portion. The midsoles are formed in a closable mold having adjustable aperture gaskets to be received in the apertures. The method comprises the steps of forming first midsole portions in a plurality of predetermined sizes with a hollow area for receiving an insert and apertures for viewing the insert, forming inserts in predetermined sizes and shapes for placement in first midsole portions of predetermined sizes, matching the predetermined size of the inserts to one or more predetermined sizes of first midsole portions, forming the size and shape of the hollow area and aperture for a given size first midsole portion to accommodate the predetermined size and shape of the insert, placing inserts into the hollow area of size matched first midsole portions, adjusting the aperture gaskets to align with the apertures, inserting the aperture gaskets into the apertures, pouring an encasing material into the hollow area of the first midsole portion and around the insert, closing the mold, and allowing the encasing material to cure around the insert to secure the insert to the first midsole portion whereby the insert and encasing material form a second midsole portion.

From the foregoing disclosure, it will be readily apparent to those skilled in the art that the present invention provides a significant technological advance whereby the method and apparatus disclosed herein can reduce the number of molds required while increasing their flexibility, thereby reducing the complexity and cost of manufacturing. These and additional features and advantages of the invention disclosed herein will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
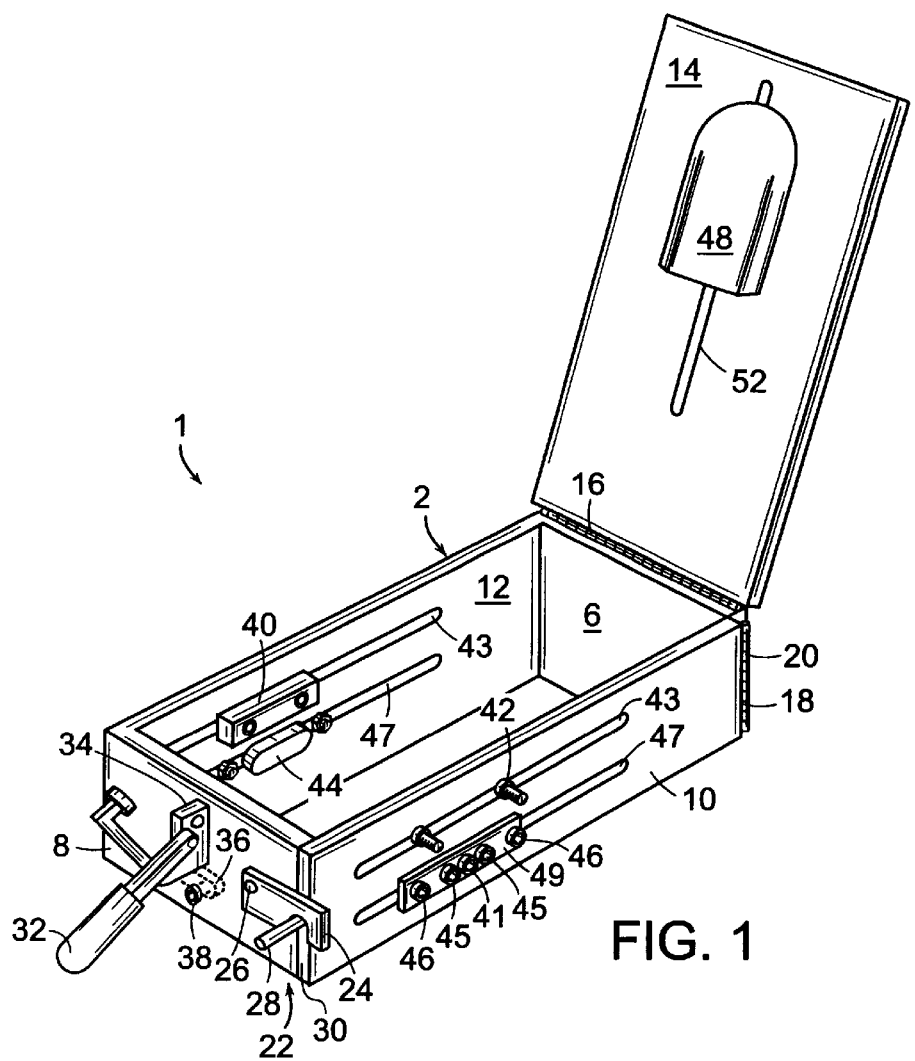
FIG. 1 is a schematic perspective view of the molding apparatus of the present invention.

The figures referred to above are not drawn necessarily to scale and should be understood to present a simplified representation of the invention, illustrative of the basic principles involved. Some features of the footwear sole molding apparatus depicted in the drawings have been enlarged or distorted relative to others to facilitate explanation and understanding. The same reference numbers are used in the drawings for similar or identical components and features shown in various alternative embodiments. Methods and apparatus for molding shoe sole components as disclosed above, will have configurations and components determined, in part, by the intended application and environment in which they are used.

DETAILED DESCRIPTION OF PREFERRED EMBODIMENTS

A preferred embodiment of molding apparatus 1, as seen in FIGS. 1–4, comprises a molding frame 2, bottom 4, opposed first and second end walls 6, 8 and opposed first and second side walls 10, 12 extending generally upwardly from bottom 4. Top 14 is attached via hinge 16 to first end wall 6. First side wall 10 is attached at first end 18 to end wall 6 via hinge 20. Latch 22 comprises plate 24 secured to second end wall 8 via pin 26, and post 28 secured to second end 30 of first side wall 10. When first side wall 10 is in its closed position, plate 24 can be pivoted so as to engage post 28, thereby fastening first side wall 10 securely to second end wall 8. Latch 22 may comprise any conventional fastener which will adequately secure first side wall 10 to end wall 8. Clamp 32 is pivotally attached to second end wall 8 via hinge 34 so as to securely fasten top 14 to molding frame 2 when top 14 is closed. Clamp 32 can be any type of fastener which will adequately secure top 14 to molding frame 2.

Heel or end support 36 is attached to second end wall 8 via fasteners 38. In a preferred embodiment, fasteners 38 are a pair of threaded members such as screws. By adjusting fasteners 38, the longitudinal position, that is, the distance between end support 36 and second end wall 8, of end support 36 can be modified, as can the angle of orientation of end support 36 with respect to second end wall 8.

Support members 40 are attached to side walls 10, 12 via fasteners 42. In a preferred embodiment support members 40 are blocks made of Teflon, but may be any appropriate member which provides a supporting function to the exterior surface of a midsole to be molded. Fasteners 42 are preferably a pair of threaded members such as bolts with accompanying nuts. Fasteners 42 extend through upper slots 43 formed in side walls 10, 12 to support members 40. When fasteners 42 are loosened, support members 40 can be moved in a longitudinal direction along the length of side walls 10, 12 as fasteners 42 travel along upper slots 43. When support members 40 are located at a desired position, fasteners 42 are then tightened to secure support members 40 to side walls 10, 12 at that position. Fasteners 42 can similarly be adjusted so that the distance between support members 40 and first and second side walls 10, 12 can be modified, as can the angle of orientation of support members 40 with respect to first and second side walls 10, 12.

Figure 7:
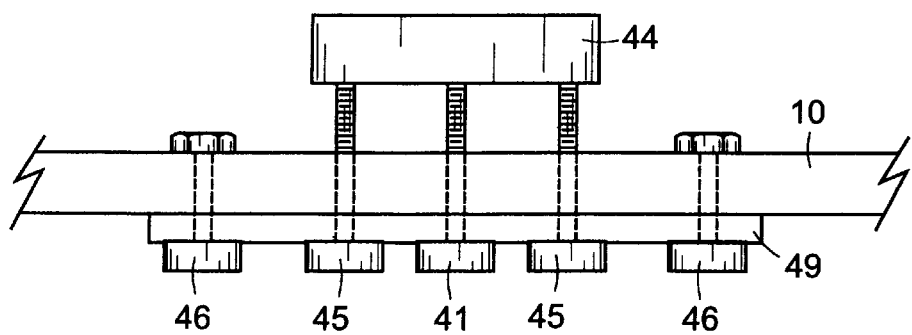
FIG. 7 is a schematic plan view of a portion of a side wall of the molding frame of FIG. 1 showing a plate secured to the side wall and a spacer secured to the plate.

Lower slots 47 extend along each side wall 10, 12. Plates 49 are secured to the exterior of side walls 10, 12 via fasteners 46 which extend through slots 47, as seen in FIG. 7. In a preferred embodiment fasteners 46 are nuts and bolts which securely fasten plates 49 to first and second side walls 10, 12. Spacers or aperture sealing gaskets 44 are attached to plates 49 via fasteners 41, 45 which extend through lower slots 47. Fasteners 41, 45 are preferably threaded members such as screws or bolts. Fastener 41 can be adjusted in a medial direction with respect to molding frame 2 to vary the distance between spacer 44 and first and second side walls 10, 12. Fasteners 45 are longitudinally spaced from one another and can be adjusted to change the angle of orientation of spacers 44 with respect to first and second side walls 10, 12. Spacers 44 can be moved in a longitudinal direction along the length of side walls 10, 12 by loosening fasteners 46, moving plate 49 along the side wall to a desired position as fasteners 46 travel along lower slots 47, and then tightening fasteners 46.

Figure 6:
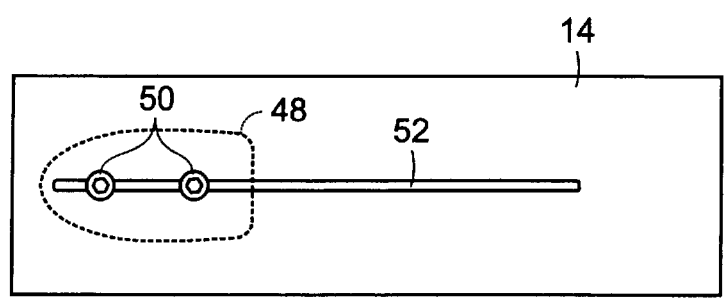
FIG. 6 is a schematic plan view of the top of the molding frame of FIG. 1.

Heel plug 48, being formed in the shape of the heel of the lasted upper, is attached to a bottom surface of top 14 via fasteners 50, as seen in FIG. 6, which extend through slot 52 formed in top 14. In a preferred embodiment fasteners 50 are a pair of threaded members such as screws. When fasteners 50 are loosened, heel plug 48 can be moved in a longitudinal direction along top 14 as fasteners 50 move along slot 52. When heel plug 48 is in a desired position, fasteners 50 can be tightened to securely fasten heel plug 48 to top 14 at that position by pulling heel plug 48 tightly against top 14. Heel plug 48 is preferably shaped with an exterior surface to match the desired profile of the interior of the heel portion of the midsole. Heel plug 48 is typically a material such as aluminum which is machined to have the desired profile. Heel plug 48 may be formed of any material which can be manufactured to have a desired profile and retain its shape after undergoing curing. Other such materials will become readily apparent to those skilled in the art given the benefit of this disclosure.

By adjusting their corresponding fasteners, heel plug 48, support members 40, spacers or gaskets 44, and end support 36 can be moved to accommodate different sized first midsole portions or differently sized or located viewing windows, thereby allowing a single molding frame 2 to be used to mold different sized midsoles. The adjustment of these fasteners also allows fine tuning of the components of molding apparatus 1 to accommodate for any change in the alignment of the different components, thereby reducing blow by and increasing the quality of the midsoles produced.

It is to be appreciated that a first midsole portion can be placed in the molding frame in the opposite direction. That is, end support 36 may be attached to end wall 6, heel last may be rotated 180°, and the remaining components may be accordingly adjusted to support the first midsole portion in this reversed direction.

Figure 3:
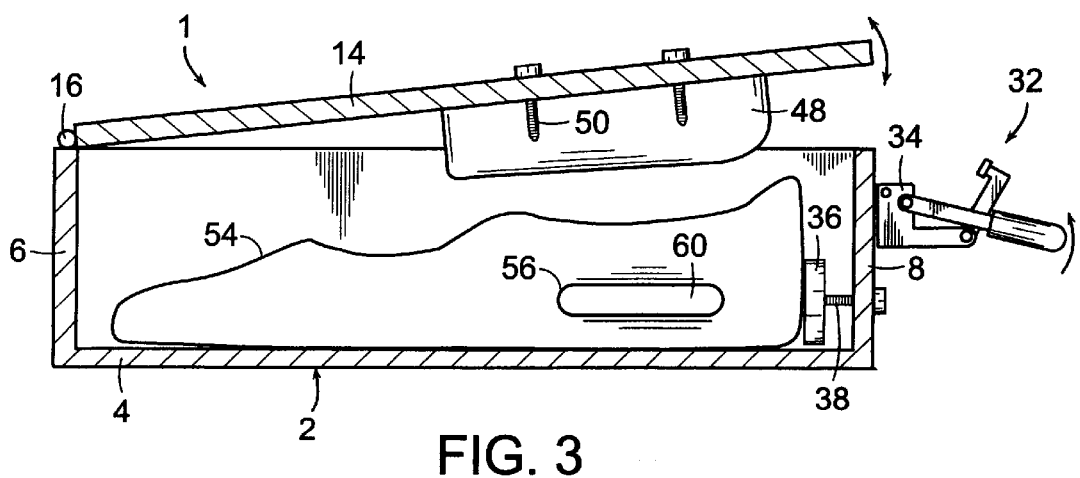
FIG. 3 is a schematic section view along the length of the molding apparatus of FIG. 1 shown with a first portion of the midsole in place within the molding apparatus and with the top slightly ajar.
Figure 2:
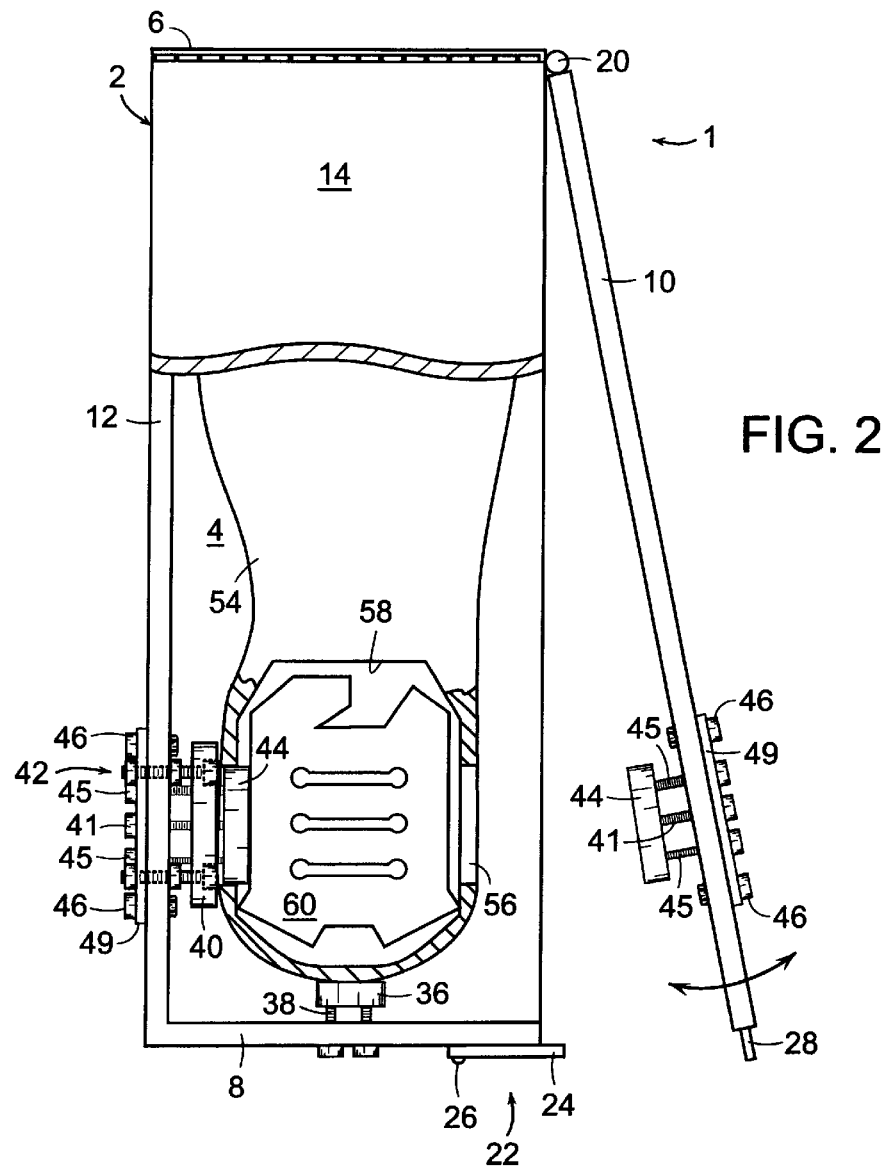
FIG. 2 is a schematic plan view of the molding apparatus of FIG. 1 shown with the hinged side wall open, a first portion of the midsole in place within the molding frame, with a portion of the top broken away, and without the support member on the hinged side wall.
Figure 4:
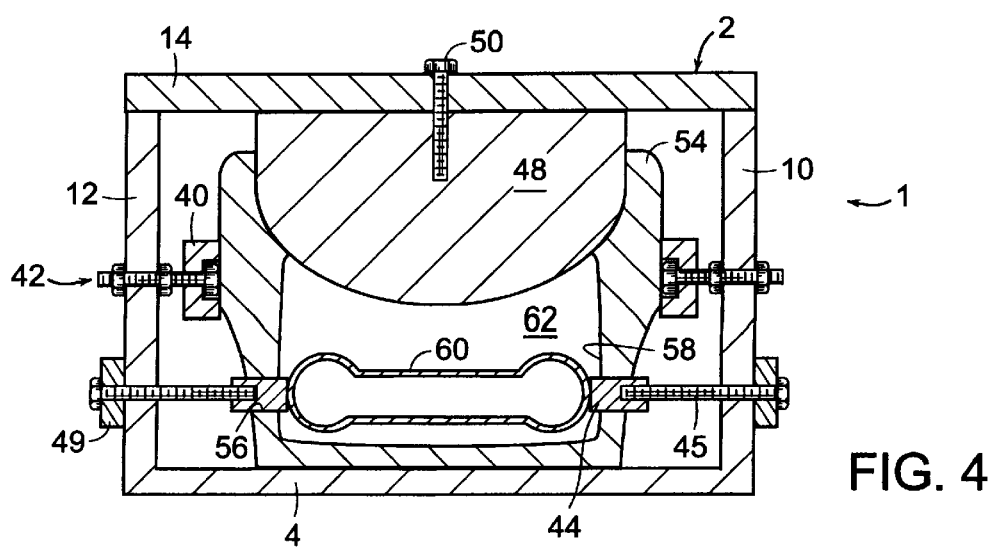
FIG. 4 is a schematic section view along the width of the molding apparatus of FIG. 1 shown with a first portion of the midsole having an insert and filler material in place in a closed position.
Figure 5:
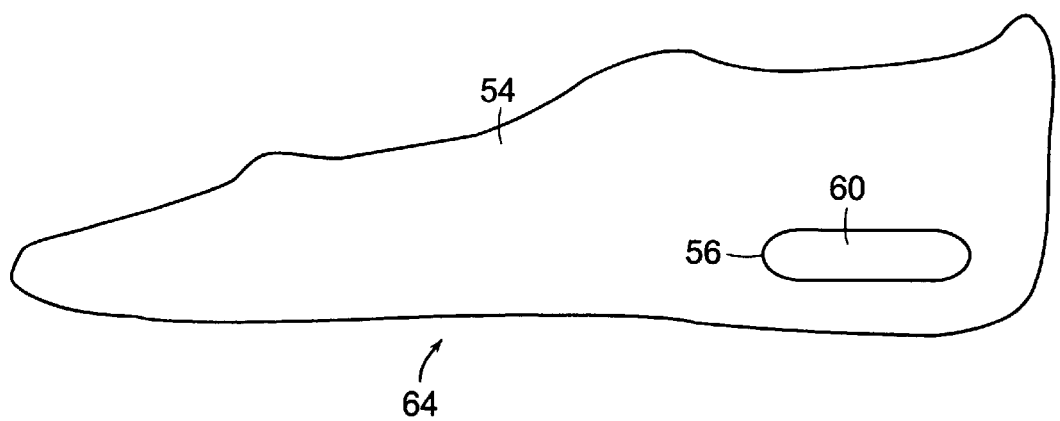
FIG. 5 is a schematic elevation view of a midsole formed in the molding frame of FIG. 1.

The operation of molding a midsole can be seen in FIGS. 2–4. Latch 22 is released by swinging plate 24 free of post 28, side wall 10 is swung to its open position, and a premolded first midsole portion 54, preferably made from compression molded EVA foam, such as Phylon, is placed in molding frame 2. First midsole portion 54 has a hollow area or cavity 58 formed in a heel portion thereof. Apertures, or windows 56, are positioned in the side walls of first midsole portion 54 and extend from outer surfaces of first midsole portion 54 to cavity 58. Side wall 10 is then swung to its closed position and latch 22 is closed, thereby securely fastening side wall 10. First midsole portion 54 is preferably positioned within molding frame 2 such that support members 40 support upper portions of the exterior side surfaces of the heel region of first midsole portion 54, end support 36 supports the rear exterior surface of first midsole portion 54, and gaskets 44 extend through each window 56. An insert, such as a fluid filled bladder, 60 is then placed within cavity 58. One preferred form of insert is a gas filled bladder as described in U.S. Pat. Nos. 4,183,156 and 4,219,945 to Marion F. Rudy and U.S Pat. No. 4,817,304 to Parker et al., hereby incorporated by reference. Insert 60 provides cushioning in the heel region of the midsole and such devices are well known in the industry. Prior to placing first midsole portion 54 into the mold, the appropriate size and shape of gaskets 44 are selected and positioned to align with window 56. Gaskets 44 can be adjusted at this point so that they fit securely within windows 56 and support the exterior of insert 60. Support members 40 and end support 36 can also be adjusted at this point to ensure that they adequately support first midsole portion 54. Encasing material or filler 62 is then poured into cavity 58 above insert 60. Filler 62 is typically liquid polyurethane, but may be any appropriate material which provides an adequate heel supporting function for the midsole of footwear and, after curing, bonds insert 60 to first midsole portion 54. Such materials will become readily apparent to those skilled in the art given the benefit of this disclosure. Top 14 is then swung to its closed position and clamp 32 is pivoted upwardly so as to secure top 14 to molding frame 2. When top 14 is in its closed position, heel plug 48 matingly engages first midsole portion 54 and disperses filler 62 along the exterior surface of heel plug 48. The interior heel portion of midsole 64 to be formed, seen in FIG. 5, consequently will have a profile which matches that of heel plug 48. The entire molding apparatus 1 is then treated in an oven in a known manner to cure filler 62. After curing, clamp 32 is released, top 14 is raised, latch 22 is released, side wall 10 is swung open, and midsole 64, seen in FIG. 5, is removed. Midsole 64 is thus formed of a first midsole portion 54, and a second midsole portion made up of insert 60 and filler 62.

During the molding process, it is desirable to have filler 62 remain in cavity 58. However, variations in manufacturing processes, settling of parts, and other factors can produce blow by, that is, seepage of filler 62 beyond its desired location into other areas of the molding apparatus 1. This blow by is due to slight gaps that may be formed between adjacent components. It is desirable to reduce blow by to the greatest extent possible. Blow by produces excess material around the periphery of midsole 64 after curing. This excess material must be trimmed by hand in order to produce a finished product which can then be inserted into an athletic shoe or other footwear. To reduce the occurrence of blow by, molding frame 2 is constructed so that fine adjustments can be made. As noted above, spacers or aperture sealing gaskets 44 can be adjusted so as to firmly engage windows 56 and support the exterior 10 of air bag 60. Specifically, gaskets 44 can be moved away from or toward side walls 10,12 by adjusting fastener 41 in order to ensure that they firmly abut the exterior of air bag 60. Additionally the angle of orientation of spacers 44 with respect to side walls 10, 12 can be varied by adjusting fasteners 45 to ensure that the mating faces of spacers 44 and air bag 60 are substantially parallel and that spacers 44 fit snugly within windows 56. The interaction of plate 49, fasteners 46, and slots 47 allows spacers 44 to be positioned at a desired location along side walls 10, 12 to ensure alignment of spacers 44 and windows 56. Support members 40 are similarly adjusted to provide support for the side walls of first midsole portion 54. Slots 43 and fasteners 42 allow support members 40 to be positioned at a desired location along side walls 10, 12 to provide support for the exterior surfaces of first midsole portion 54 at the necessary location. End support 36 can be adjusted via fasteners 38 so as to provide adequate support for the rear surface of first midsole portion 54. The distance between end support 36 and second end wall 8 can be varied to accommodate the particular first midsole portion 54 housed within molding frame 2 as well as the angle of orientation of end support 36 with respect to second end wall 8. Heel plug 48 can be adjusted so as to fit precisely within first midsole portion 54 so as to form the desired profile of the interior of midsole 64. Specifically, as seen in FIG. 6, fasteners 50, which secure heel plug 48 to top 14, extend through slot 52 so that heel plug 48 may be moved along the length of top 14 to a desired location. These fine adjustments allow a tight seal to be maintained between all of the components of the molding apparatus 1, thereby reducing blow by. Over time, the components of molding apparatus 1 may settle and or realign themselves, leading to the need to fine tune the adjustment of the components of the molding apparatus 1 on an on-going basis.

In a preferred embodiment, multiple sizes of midsole 64 can be molded in the same molding apparatus 1. Heel plug 48 and gaskets 44 are designed to be interchangeable to accommodate different sized first midsole portion 54. To mold a different sized midsole 64, heel plug 48 and gaskets 44 are removed and replaced with another heel plug 48 and gasket 44 having the appropriate size. Support members 40 and end support 36 generally need not be replaced to accommodate a different sized first midsole portion 54 in molding frame 2. Support members 40 can be positioned along side walls 10,12 at a desired location as fasteners 42 can move along slot 43 to the appropriate location. End support 36 can be located an appropriate distance from second end wall 8 via an adjustment of fasteners 38. By selecting appropriately sized gaskets 44 and heel plug 48, and adjusting support members 40 and end support 36, first midsole portion 54 of different sizes can be placed in molding frame 2 to form corresponding midsoles 64 of different sizes. It is to be appreciated that end support 36 and support members 40 may, in certain embodiments, be formed of different sizes to accommodate different sized first midsole portion 54.

This interchangeability of parts and adjustment of components eliminates the need for a second fully developed mold to form midsole 64 from first midsole portion 54, thereby advantageously reducing manufacturing costs. The interchangeability of a small number of components allows a quick changeover of the tooling required to mold different sized midsoles. This time savings can result in cost savings as well as flexibility in manufacturing by being able to efficiently produce small runs of a certain sized midsole and quickly and efficiently change the mold to accommodate a different sized midsole.

This flexibility allows a method of mass production of shoe midsoles having a variety of sizes by selecting components of predetermined sizes. First midsole portions 54 are formed in a plurality of predetermined sizes with a hollow area or cavity 58 for receiving an insert 60 and an aperture 56 in at least one side, and preferably in both sides for viewing insert 60. Inserts 60 are likewise formed in a plurality of predetermined sizes and shapes. Predetermined sizes of inserts 60 are matched to one or more predetermined sizes of first midsole portions. For example, one size and shape of insert 60 may be able to fit within two or three half-sizes of first midsole portions. The hollow area or cavity 58 for a given size first midsole portion 54 is formed to a size and shape that accommodates the predetermined size and shape of insert 60. Inserts 60 are placed into the hollow area or cavity 58 of sized matched first midsole portions. Apertures 56 are of a predetermined size as well to match the first midsole portion 54 and insert 60. Gaskets 44 of a predetermined size are adjusted along the length of molding frame 2 to align with corresponding apertures 56. Gaskets 44 are inserted into apertures 56, completely sealing apertures 56, and filler 62 is then poured into cavity 58 above insert 60. Molding frame 2 is then closed, and filler 62 sets by curing, thereby encasing insert 60 within first midsole portion 54 and forming midsole 64. Support members 40 and end last 36 are adjustable, and gaskets 44 and heel plug 48 can be replaced with corresponding components of a different size, as described above, thereby allowing these components to properly engage and support first midsole portions 54 of different sizes.

If the design of first midsole portion 54 changes, or certain aspects such as the shape or size of windows 56, or the shape or size of insert 60, were to change, the molding apparatus 1 can quickly and easily be modified to accommodate these changes. Specifically, for example, if the shape or size of windows 56 were to change, only gaskets 44 would need to be redesigned and manufactured. The other components of molding frame 2 would remain the same, thereby resulting in reduced redesign and manufacturing costs. The other components, as noted above, can be adjusted to accommodate changes in the design of first midsole portion 54.

In light of the foregoing disclosure of the invention and description of certain preferred embodiments, those skilled in the art will readily understand that various modifications and adaptations can be made without departing from the true scope and spirit of the invention. All such modifications and adaptations are intended to be covered by the following claims.

We claim:

1. A method for mass producing midsoles for articles of footwear in a variety of sizes, with the midsoles including a first midsole portion, an insert received in a hollow area in the first midsole portion, and an aperture in at least one side of the first midsole portion to make the insert visible from a side of the first midsole portion, the article of footwear midsoles being formed in a closable mold having at least one adjustable aperture gasket to be received in the aperture, comprising the steps of:

forming first midsole portions in predetermined sizes with a hollow area in the first midsole portion for receiving an insert and an aperture in at least one side of the first midsole portion for viewing the insert;

forming inserts in predetermined sizes and shapes for placement in the hollow area of the first midsole portions;

matching the predetermined size of the inserts to one or more predetermined sizes of first midsole portions;

forming the size and shape of the hollow area and aperture for a given size first midsole portion to accommodate the predetermined size and shape of the insert;

placing inserts into the hollow area of size matched first midsole portions;

adjusting the position of the at least one aperture gasket along the side of the mold to align with the aperture in the at least one side of the first midsole portion;

inserting the at least one aperture gasket into the aperture in the at least one side of the first midsole portion to completely seal the aperture;

pouring an encasing material into the hollow area of the first midsole portion and around the insert;

closing the mold around the hollow area of the first midsole portion; and allowing the encasing material to cure around the insert to secure the insert to the first midsole portion whereby the insert and encasing material form a second midsole portion.

2. A method in accordance with claim 1, wherein the at least one aperture gasket is movable in the longitudinal direction of the midsole, and the step of adjusting the at least one aperture gasket includes adjusting the longitudinal position of the at least one aperture gasket with respect to the mold to align the aperture gasket with the aperture in the at least one side of the first midsole portion.

3. A method in accordance with claim 2, wherein the at least one adjustable aperture gasket is movable in the medial direction of the midsole, and the step of adjusting the at least one aperture gasket includes adjusting the medial position of the at least one aperture gasket with respect to the mold to form a seal against the insert.

4. A method in accordance with claim 2 wherein the at least one adjustable aperture gasket is movable in the medial direction of the midsole at two longitudinally spaced apart points, and the step of adjusting the at least one aperture gasket includes adjusting the medial position of the at least one aperture gasket at the two longitudinally spaced apart points to form a seal against the insert.

5. A method in accordance with claim 2 wherein the at least one adjustable aperture gasket is removable from the mold, and the step of adjusting the at least one aperture gasket includes attaching at least one removable aperture gasket to the mold that is configured to the size and shape of the aperture in the at least one side of the first midsole portion.

6. A method in accordance with claim 1 wherein the closeable mold includes at least one support member movable in the longitudinal direction of the midsole to support an exterior side of the first midsole portion, the method further comprising the steps of:

adjusting the longitudinal position of the at least one support member with respect to the mold to align the at least one support member with the exterior of the first midsole portion.

7. A method in accordance with claim 1 wherein the closeable mold includes a moveable heel plug to form a seal along at least a portion of the top of the first midsole portion, and further comprising the steps of:

adjusting the longitudinal position of the heel plug with respect to the mold to align the heel plug with the portion of the top of the first midsole portion to be sealed.

8. A method in accordance with claim 7 wherein the heel plug is removable from the mold, and the step of adjusting the longitudinal position of the top last includes attaching a removable heel plug to the mold that is configured to the size and shape of the portion of the top of the first midsole portion to be sealed.

9. A method in accordance with claim 1, wherein the closeable mold includes a moveable end support to support the exterior of a longitudinal end of the first midsole portion, further comprising the steps of:

adjusting the longitudinal position of the end support with respect to the mold to align the end support with the longitudinal end of the first midsole portion.

10. A method of producing a midsole for articles of footwear, with the midsole including a first midsole portion, an insert received in a hollow area in the first midsole portion, an aperture in at least one side of the first midsole portion to make the insert visible from a side of the first midsole portion, and the midsole being formed in a closeable mold having at least one adjustable aperture sealing gasket to be received in the aperture, comprising the steps of:

forming a first midsole portion with a hollow area in the first midsole portion for receiving an insert and an aperture in at least one side of the first midsole portion for viewing the insert;

forming an insert for placement in the hollow area of the first midsole portion;

placing the insert into the hollow area of the first midsole portion;

adjusting the position of the at least one aperture gasket along a side of the mold to align with the aperture in the at least one side of the first midsole portion;

inserting the aperture gasket into the aperture in the at least one side of the first midsole portion to completely seal the aperture;

pouring an encasing material into the hollow area of the first midsole portion and around the insert;

closing the mold around the hollow area of the first midsole portion; and allowing the encasing material to cure around the insert to secure the insert to the first midsole portion whereby the insert and encasing material form a second midsole portion.

11. A method in accordance with claim 10, wherein the at least one adjustable aperture gasket is movable in the longitudinal direction of the midsole, and the step of adjusting the at least one aperture gasket includes adjusting the longitudinal position of the aperture gasket with respect to the mold to align the at least one aperture gasket with the aperture in the at least one side of the first midsole portion.

12. A method in accordance with claim 11, wherein the at least one adjustable aperture gasket is movable in the medial direction of the midsole, and the step of adjusting the at least one aperture gasket includes adjusting the medial position of the at least one aperture gasket with respect to the mold to form a seal against the insert.

13. A method in accordance with claim 11 wherein the at least one aperture gasket is movable in the medial direction of the midsole at two longitudinally spaced apart points, and the step of adjusting the at least one aperture gasket includes adjusting the medial position of the at least one aperture gasket at the two longitudinally spaced apart points to form a seal against the insert.

14. A method in accordance with claim 11 wherein the at least one aperture gasket is removable from the mold, and the step of adjusting the at least one aperture gasket includes attaching at least one removable aperture gasket to the mold that is configured to the size and shape of the aperture in the at least one side of the first midsole portion.

15. A method in accordance with claim 10 wherein the closeable mold includes at least one support member movable in the longitudinal direction of the midsole to support at least one exterior side of the first midsole portion, and, further comprising the steps of:

adjusting the longitudinal position of the at least one support member with respect to the mold to align the at least one support member with the exterior of the first midsole portion.

16. A method in accordance with claim 10 wherein the closeable mold includes a longitudinally moveable heel plug to form a seal along at least a portion of the top of the first midsole portion, and, further comprising the steps of:

adjusting the longitudinal position of the heel plug with respect to the mold to align the heel plug with the portion of the top of the first midsole portion to be sealed.

17. A method in accordance with claim 16 wherein the heel plug is removable from the mold, and the step of adjusting the longitudinal position of the heel plug includes attaching a removable heel plug to the mold that is configured to the size and shape of the portion of the top of the first midsole portion to be sealed.

18. A method in accordance with claim 10 wherein the closeable mold includes a longitudinally movable end support to support the exterior of a longitudinal end of the first midsole portion, further comprising the steps of:

adjusting the longitudinal position of the end support with respect to the mold to align the end support with the longitudinal end of the first midsole portion.

* * * * *